United States Patent Office 3,549,576
Patented Dec. 22, 1970

3,549,576
RESOLE VARNISH MIXTURE
George J. Anderson, Wilbraham, and Ronald H. Dahms, Springfield, Mass., assignors to Monsanto Company, St. Louis, Mo., a corporation of Delaware
No Drawing. Filed June 21, 1968, Ser. No. 738,775
Int. Cl. C08g 37/18
U.S. Cl. 260—29.3         6 Claims

ABSTRACT OF THE DISCLOSURE

Phenolic varnishes having dissolved therein two different resole resins. These varnishes are suitable for use in the production of paper laminates having high electrical properties by using only a single pass preparation procedure.

BACKGROUND

Phenolic varnishes are used to make so-called electrical grade paper laminates having excellent electrical properties together with acceptably high values for flexural strength, water absorption and other properties associated with a finished laminate. To make such paper laminates, the art employs characteristically a paper of high purity (that is, one relatively free from ionic materials capable of conducting an electric current).

Heretofore, when impregnating such a paper with phenolic varnish to make an electrical grade laminate, the art has generally employed a two-pass phenolic resin system by which reference is had to the fact that such paper is first impregnated with a low molecular weight, generally unmodified resole resin (typically using a resole resin varnish or aqueous solution which is applied to such paper by spraying, dipping, or the like). Following this first impregnating or coating operation, the residual solvent in the varnish is removed by evaporation, and the resulting paper is coated or impregnated a second time with a modified resole resin varnish. This second varnish contains a pheonlic resin which when thermoset has better electrical properties than those associated with the first or unmodified resole resin (when it is thermoset). Such a two-pass system was generally heretofore necessary in order to obtain the desired excellent electrical properties needed in an electrical grade paper laminate made with phenolic resin varnishes.

Although the art has attempted heretofore to produce a phenolic resin varnish system which would enable one to impregnate paper to be used in electrical grade laminates in a single pass (as opposed to two passes as just described), such prior art efforts have not been particularly successful.

There has now been surprisingly discovered a phenolic varnish system which can be used in a one-pass impregnation step to produce paper laminates having relatively high electrical properties as well as acceptably high flexural strength and water absorption properties. Furthermore, this novel phenolic varnish system is storage stable and contains characteristically an extremely high percentage of total solids relative to amounts of phenol used as starting material so that such a varnish is capable of depositing on and in a sheet of paper surprisingly high percentages of total solids. These novel phenolic varnishes comprise an organic liquid having dissolved therein two widely differing (as respects structure and properties) resole resins. One of these resins is a low molecular weight base catalyzed condensation product of phenol and formaldehyde, the other is a relatively high molecular weight base catalyzed condensation product of a certain substituted phenol mixture and formaldehyde. As respects capacity to produce electrical grade paper laminates through a single pass impregnation procedure, the phenolic varnish system of the present invention can be considered to comprise an unexpected synergistic mixture of two different but compatible phenolic resins.

SUMMARY

This invention is directed to new and very useful solutions of resole resins in organic solvents. The solutions are especially adapted for use in the manufacture of so-called electrical grade paper laminates having high flexural strength, low water absorption, and excellent electrical properties. The organic solutions of this invention comprise—

(A) from about 20 to 75 weight percent of a dissolved mixture of a first phenolic resin and a second phenolic resin,
(B) from about 0.5 to 15 weight percent of dissolved water, and
(C) the balance up to 100 weight percent of any given solution being an organic liquid which:
    (1) is substantially inert (as respects such resin mixture),
    (2) evaporates below about 150° C. at atmospheric pressures,
    (3) is a mutual solvent for such resin mixture and for said water (if present).

The weight ratio of said first phenolic resin to said second phenolic resin in such mixture ranges from about 1:2 to 1:20 (dry weight basis).

The first phenolic resin is a resole resin. It has a formaldehyde to phenol mol ratio of from about 0.9 to 2.5 and is produced by reacting under aqueous liquid phase conditions phenol with formaldehyde in the presence of an organic basic catalyst. It has a low molecular weight as shown by the fact that this resin is water soluble as shown by the fact that a 55 weight percent aqueous solution thereof can be prepared. This solution characteristically has a water dilutability of at least about 1:1, and preferably of at least about 8:1. In addition, this resin has a free formaldehyde content which is less than about 5 weight percent. Preferably, the formaldehyde to phenol mol ratio in this resin ranges from about 1½ to 2. An organic basic catalyst is used in preparation as indicated so as to produce a resole resin product which will not contain free ions which might conduct an electrical charge after the resin has been thermoset. Suitable organic basic catalysts are well known to the art; examples include triethylamine, hexamethylenetetramine, and the like.

The second resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. This second resole resin further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

The substituted phenol mixture used to make such second resole resin is itself prepared by reacting phenol under Friedel-Crafts conditions with a controlled mixture of carbocyclic compounds. The mixture of carbocyclic compounds comprises (on a 100 weight percent basis when in a form substantially free of other materials—

(A) from about 10 through 40 weight percent of compounds each molecule of which has:
  (1) the indene nucleus,
  (2) from 9 through 13 carbon atoms,
  (3) as nuclear substituents from 0 through 4 methyl groups,
(B) from about 5 through 70 weight percent of compounds each molecule of which has:
  (1) the dicyclopentadiene nucleus,
  (2) from about 10 through 13 carbon atoms,
  (3) as nuclear substituents from 0 through 3 methyl groups,
(C) from about 15 through 65 weight percent of compounds each molecule of which has:
  (1) a phenyl group substituted by a vinylidene group,
  (2) from about 8 through 13 carbon atoms,
  (3) as substituents from 0 through 3 groups selected from the class consisting of methyl and ethyl,
(D) from about 0 through 5 weight percent divinyl benzene,
(E) provided that the sum total of all such compounds in any given such mixture of carbocyclic compounds is always 100 weight percent.

At the time when such controlled mixture of carbocyclic compounds is reacted with phenol as indicated, there can be present in such mixture as diluents inert (i.e. as respects reactively towards phenol under Friedel-Crafts reaction conditions) organic compounds such as aromatic and aliphatic hydrocarbons. Thus, there is present, conveniently, at least about 25 weight percent of diluent in such total combination of mixture of carbocyclic compounds and diluent, although this value is variable depending upon reactants and reaction conditions. While there is no apparent upper limit on the amount of diluent which may be present, it is preferred that the amount of diluent present be not greater than about 95 weight percent (same basis). Preferably, the amount of diluent ranges from about 15 to 70 weight percent (same basis). Up to about 10 weight percent (same basis) of water can be present, but it is preferred to use substantially anhydrous conditions.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD." Another suitable such mixture is available from Monsanto Company, St. Louis, Mo., under the trade designation "Resin Oil." Still another such mixture is available from the Gulf Oil Company under the trade designation "Resin Former Feed Stock." A presently preferred such mixture is the Monsanto Company "Resin Oil" which is a $C_8$ to $C_{13}$ product cut with a boiling range of from about 300 to 425° F. (150 to about 220° C.) and contains the indicated carbocyclic compound mixture. Shown below in Table I is a breakdown such as is made by vapor phase chromatography showing the composition of these three carbocyclic compound mixtures:

TABLE I

| | Gulf Oil [2] | Monsanto [3] | Enjay |
|---|---|---|---|
| Vinylidene Aromatics: | | | |
| Styrene $C_8$ | 7.6 | 1.4 | 10.1 |
| Alpha-methylstyrene $C_9$ | 1.6 | 2.8 | 2.2 |
| Beta-methylstyrene $C_9$ | 1.5 | 1.6 | 2.1 |
| Vinyltoluene $C_9$ | 4.5 | 17.4 | 10.5 |
| $C_2$ Alkylstyrene[1] $C_{10}$ | 0.9 | 6.2 | 5.8 |
| Divinylbenzene $C_{10}$ | 0.3 | 1.3 | 1.6 |
| Indenes: | | | |
| Indene $C_9$ | 12.7 | 17.6 | 12.7 |
| Methylindene $C_{10}$ | 0.3 | 5.5 | 7.6 |
| Cyclopentadienes: | | | |
| Isoprene-cyclopentadiene $C_{10}$ | 0.6 | 0.3 | |
| Dicyclopentadiene $C_{10}$ | 42.7 | 13.9 | 1.1 |
| Methylcyclopentadiene $C_{11}$ | 12.4 | 4.6 | 2.1 |
| Alkyl Aromatics: | | | |
| Benzene $C_6$ | 0.5 | | 0.1 |
| Toluene $C_7$ | 3.9 | | 0.8 |
| $C_2$ Alkylbenzene $C_8$ | 7.4 | 0.4 | 12.1 |
| $C_3$ Alkylbenzene $C_9$ | 1.2 | 19.2 | 22.2 |
| $C_4$ Alkylbenzene $C_{10}$ | | 4.1 | 6.3 |
| Naphthalenes: Naphthalene $C_{11}$ | 0.2 | 3.2 | 2.2 |
| Unidentified (aliphatics) | 2.1 | | |
| Total carbocyclic compound mixture content | 84.8 | 72.6 | 55.9 |
| ASTM boil range, °F. (ASTM D-86): | | | |
| Initial boiling point | 283 | 315 | 307 |
| 10% | 318 | 333 | 320 |
| 50% | 329 | 343 | 342 |
| 90% | 348 | 367 | 401 |
| End point | 364 | 402 | 411 |
| Residue | 1.0 | | |
| Specific Gravity | 0.952 | 0.933 | 0.909 |

[1] This styrene compound is selected from the group consisting of ethyl styrene and dimethylstyrene.
[2] Available commercially from the Gulf Oil Co. as "Resin Former Feed Stock."
[3] Available commercially from the Monsanto Company under the trade designation "Resin Oil."
[4] Available commercially from Enjay Company under the trade designation "Heart Cut LPD."

By the term "dicyclopentadiene" reference is had to a molecule having the structure:

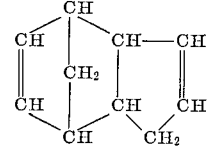

By the phrase "when in a form substantially free of other materials" reference is had to a mixture (e.g. of starting materials, of products, or the like, as the case may be) which is substantially free (e.g. on an analytical or a theoretical basis) of substances (like inerts) other than such mixture itself. For example, in Table I above, the carbocyclic compound mixtures are composed of indenes, vinylidene aromatics, and dicyclopentadienes, as well as inert diluents, such as "alkyl aromatics," "naphthalenes" and "unidentified aliphatics," but each contains a combination (on a 100 weight percent basis in a form substantially free of other materials) of components (indenes, dicyclopentadiene, and vinylidene aromatics) as described above.

In this invention, all solids are conveniently measured using the ASTM Test Procedure D115–55.

Also, in such a preferred embodiment, the substituted phenol used in making phenolic resin is made using a carbocyclic compound mixture in which there are from about 20 through 40 weight percent of compounds having the indene nucleus (as above described) from about 15 through 30 weight percent of compounds having the dicyclopentadiene nucleus (as above described) and from about 30 through 65 weight percent of compounds having a phenyl group and a vinylidene group as above described, the percentage of divinyl benzene in such preferred carbocyclic compound mixture being as described above. In any such more preferred carbocyclic compound mixture, there are a total of 100 weight percent of these three components.

The term "vinylidene" as used herein has generic reference both to vinylidene radicals ($CH_2=C<$), and vinyl radicals ($CH_2=CH—$ or $—CH=CH—$); observe that in carbocyclic compound mixtures used in this invention having a phenyl group substituted by a vinylidene group, alpha-methyl substitution is included in this definition, as well as styrene, methyl styrene, and ethyl styrene.

To react phenol with such an aforedescribed carbocyclic compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol and suitable Friedel-Crafts acid catalysts are mixed, brought to the proper temperature and the carbocyclic compound mixture metered into the acidified (or catalyzed) phenol.

For purposes of this invention, the reaction of carbocyclic compound mixture with phenol is preferably carried out at temperatures in the range of from about 25 to 200° C. although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted carbocyclic compound mixture using, for example, vapor phase chromatography.

Friedel-Crafts catalysts which may be used in place of aluminum chloride, or together with aluminum chloride, include:

(A) other inorganic halides, such as gallium, titanium, antimony and zinc halides (including $ZnCl_2$);
(B) inorganic acids such as sulphuric, phosphoric and the hydrogen halides (including HF);
(C) activated clays, silica gel and alumina;
(D) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid acetic acid, propionic acid, and the like, or with inorganic acids, such as phosphoric acid, sulfuric acid, and the like, and
(E) alkyl, aryl and aralkyl sulfonic acids, such as ethanesulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, β-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol and catalyst can be used, it is particularly convenient to react in the presence of less than about 10 weight percent (based on the phenol) of acid catalyst.

The reaction mass is heated to a temperature in the range of from about 25 to 200° C. The rate of this reaction is dependent, to some degree, on the temperature employed. In general, the reaction is rapid, and a complete reaction between phenol and carbocyclic compound mixture is preferred. Generally, a heating time of from about 10 minutes to 4 hours is employed. The various process variables are summarized in Table II below.

TABLE II

| Process variable | Broad range | Preferred range |
| --- | --- | --- |
| Temperature (° C.) | About 25 to 200° C. | About 40 to 125° C. |
| Reaction time | Less than about 4 hrs. | About 10 to 30 min. |
| Catalyst (based on phenol) | Less than about 10 weight percent. | About 0.1 to 1.0 weight percent. |
| Inert hydrocarbon diluent (based on total weight carbocyclic mixture and diluent). | Up to about 75 weight percent. | About 20 to 35 weight percent. |
| Total carbocyclic mixture [1] (based on 100 parts by weight phenol). | About 10 to 80 parts by weight. | About 40 to 60 parts by weight. |

[1] On a 100 weight percent basis when in a form substantially free of other materials.

The properties of a given so-substituted phenol product are affected by the process conditions used to make that product ( e.g. molecular weight distribution, color and the like). The resulting reaction product is, as those skilled in the art will appreciate, a complex mixture of various different substituted phenols produced from the reaction of phenol under Friedel-Crafts conditions with the carbocyclic compound starting mixture to produce phenol molecules which are substituted both on ring carbon atoms and on phenol hydroxyl oxygen atoms by moieties derived from such carbocyclic compound.

A substituted carbocyclic compound phenol product can be prepared in a form substantially free of starting materials by conventional distillation separation techniques (e.g. steam distillation, vacuum stripping, and the like), as those skilled in the art will appreciate, but in making resoles for use in this invention, such product can be used directly as made.

In general, to produce a second resole resin for use in this invention, a substituted phenol product, as just described, is neutralized under aqueous liquid phase conditions as by the addition of base, and then from about 0.8 to 2.0 mols of formaldehyde per one mol of phenol (preferably from about 1.0 to 1.5 mols aldehyde per mol of phenol) is mixed with the substituted phenol product (now itself a starting material). Water may be added with the formaldehyde. Formalin is preferred as a source for formaldehyde. Also, a basic catalyst material, such as hexamethylenetetramine, ammonium hydroxide, triethylamine, sodium hydroxide, or mixtures thereof (or the like) is introduced into the reaction mixture. This basic catalyst can be used to neutralize the starting substituted phenol. Preferred catalysts are organic. The pH of this reaction mixture is maintained above 7.0 and preferably in the range from about 7.5 to 8.5. This reaction mixture is then heated to temperatures of from about 60 to 100° C. for a time sufficient to a substantially react most of the aldehyde and produce a desired resole product. Times of from about 20 to 140 minutes are typical. Aqueous liquid phase preparation conditions are generally but not necessarily used.

It will be appreciated that the aldehyde to phenol ratios herein described have reference to the total amount of phenol present before a reaction, including the phenol which is substituted by the carbocyclic compound mixture, as described above.

To optimize electrical properties in second resoles used in this invention, it is preferred to use as a basic catalyst, when reacting such substituted phenols with formaldehyde to make resole resins, one which is organic in character.

In general, such a second resole product as made is a brown colored, unstable, multiphase aqueous emulsion whose viscosity depends, in any given instance, upon process and reactant variables but which usually ranges from a syrupy liquid to a semi-solid state. Such a second resole product usually separates from such aqueous phase as a brown colored material whose viscosity varies from a syrup to a solid. For use in the present invention, such a second resole resin is preferably prepared as a varnish.

To make a second resole resin varnish of this invention, such an emulsion is dehydrated preferably under heat and reduced pressure to a water content of from about 0.5 to 15 weight percent.

After such dehydration, the resulting resin is then dissolved in a relatively volatile, inert organic solvent medium which is as described above.

While the organic liquid used has properties as indicated above, it will be appreciated that such liquid can comprise mixtures of different organic liquids. Preferred liquids are lower alkanols (such as ethanol and mtthanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken to use an organic liquid system in which the phenolic resole resins are completely soluble as well as any water present. Adding, for example, a ketone or an ether-ester solvent like butyl Cellosolve will generally improve the water tolerance (ability to dissolve water) of a solvent system.

The second resole resin varnishes, thus made, are characteristically dark colored, one-phase, clear liquid solutions each having a viscosity ranging from about 5–5000 centipoises. The exact viscosity of a given varnish, depends upon many chemical process and product variables. For impregnating applications, viscosities of from about 50 to 500 centipoises are preferred.

The organic solutions of this invention have the first and second resins each dissolved therein as a physical mixture. The weight ratio of the first phenolic resin to the second is as indicated above.

A convenient preparation technique involves simply adding the first phenolic resin (as prepared in aqueous solution) to a previously prepared organic solvent solution of the second phenolic resin. Those skilled in the art will appreciate that care must be taken when using this procedure to use an organic solvent liquid system in which both phenolic resins are soluble as well as water. Adding, for example, a ketone or an ether-ester solvent like butyl Cellosolve improves the water tolerance (ability to dissolve water) of a solvent system.

The total phenolic resin solids content of a solution of this invention can vary over a wide range, as indicated, but the exact content for a given use situation is conveniently controlled by the conditions and equipment employed for application. To control water content of a product, the first phenolic resin is either dehydrated optionally using vacuum and elevated temperatures (e.g. 50° C. and 28" Hg) or left in water, provided that the admixture of the two different resins results in a system containing from about 0.5 to 15 weight percent water.

These product compositions of this invention are characteristically dark colored, one-phase, clear liquids (or varnishes) having a viscosity ranging from about 50–5000 centipoises, the viscosity of a given such varnish depending upon chemical process and product variables. For impregnating applications, viscosities of from about 50 to 500 centipoises are usual. The total solids content of such a varnish can be as high as 85 weight percent or even higher, and as low as 20 weight percent and even lower, but preferred solids content of a concentrated varnish typically ranges from about 25 to 65 weight percent. As those skilled in the art will appreciate, the varnishes of this invention can be advanced to a greater extent without forming precipitates from the organic solvent phase than is the case of aqueous resole products of this invention.

When used for impregnation and reinforcing purposes, the liquid resole resins and the varnishes of this invention find use in cellulosic paper, asbestos paper, fabrics (cotton, glass fibers, nylon, etc.), etc. Impregnation can be accomplished by any convenient means including dipping coating, spraying, mixing, or the like. The so-impregnated material is dried to lower the volatiles content and then heated to advance the resin to the proper degree for the intended use.

In particular, the resole varnishes of this invention are useful in the preparation of paper laminates. Such laminates are used in electrical applications as supports or as insulation for conductive elements. The laminates are generally provided in sheet or block form which are then punched or otherwise machined to provide the desired configurations.

Thus, a varnish of the present invention can be used to impregate a pre-formed sheet-like structure, organic or inorganic in composition and thereafter dried sufficiently to remove the volatile inerts therefrom. Similarly, the varnishes of the present invention can be used to make laminates composed of a plurality of pre-formed adjacent sheet-like structures being bonded to one another by means of a cured resin derived from the product varnish of the present invention.

In a preferred embodiment of the present invention, an organic solution contains from about 55 to 65 weight percent (total solution basis) of a dissolved mixture of first phenolic resin and second phenolic resin. In such a preferred solution, there are from about 6 to 12 parts of dissolved water (total solution basis). Also in such a preferred embodiment, the weight ratio of first phenolic resin to second phenolic resin ranges from about 1:4 to 1:8 (dry mixture weight basis). In this invention, all solids are conveniently measured using the ASTM Test Procedure D115–55.

Also in such a preferred embodiment, the substituted phenol used in making the second phenolic resin is made using a preferred starting carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group as above described, the percentage of divinyl benzene is such preferred carbocyclic compound mixture being as described above. In any such preferred carbocyclic compound mixture, there are a total of 100 weight percent of these three components.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLE A

Charge 100 parts of phenol and 1 part of concentrated sulphuric acid to a suitable reaction vessel and heat the mixture to 50° C. Add 70 parts of a carbocyclic compound mixture available commercially under the trade designation Monsanto "Resin Oil" having a composition as given above (Table I) to the starting mixture while keeping the temperature stable at 50° C. Hold the temperature of the mixture at 50° C. after addition of the resin oil for 1 hour and then add 7.5 cc. of 28% $NH_4OH$ thereto to neutralize acid catalyst. To the neutralized reaction mixture add 2 parts of triethylamine and 60 parts of 50% Formalin (50–50 formaldehyde-water). Now heat the reaction mixture to a reflux at 100° C. and continue refluxing for 4 hours. Then cool the reaction mixture and remove volatile material under a vacuum of 28 inches of mercury until the temperature of the mixture rises to 80° C. Then add 50 parts of methanol and 10 parts of acetone to form a solution having 71.4% solids (measured by heating 1½ grams of resin for 3 hours at 135° C.), an Ostwald viscosity of 4582 centipoises at 25° C., a pH of 8.42 and a water content of 1.76%.

EXAMPLE B

Charge 100 parts of phenol and 1 part of concentrated sulphuric acid to a suitable reaction vessel. And 50 parts of the carbocyclic compound mixture used in Example A to the starting mixture gradually over a period of 30 minutes. The temperature of the reaction mixture rises due to the exothermic reaction. Hold the temperature of the mixture at 75° C. for 30 minutes and then add 7.5 parts of 28% $NH_4OH$ to neutralize the acid catalyst. Then add 2 parts of triethylamine and 60 parts of 50% Formalin to the neutralized mixture. Now heat the mixture to a reflux at 100° C. and continue heating the mixture for 2 hours. Cool the mixture and remove volatile material under a vacuum of 28 inches of mercury until the temperature of the mixture rises to 80° C. Then add 60 parts of methanol to form a solution having a solids content of 68.5% and a pH of 8.62.

EXAMPLES C THROUGH N

The following examples are presented in tabular form for brevity. The process in all instances is as in Example A except that the indicated variable are altered as shown in Table II below in each respective instance.

Arylalkene mixture A is Monsanto Resin Oil; B is Enjay's Heart Cut LPD; and C is Gulf Resin Former Feedstock in Table III.

Also in Table III below, the numbers listed under "Type Catalyst" desingate specific Friedel-Crafts catalysts as follows:

(1) $H_2SO_4$
(2) $BF_3$·diethyl ether
(3) p-toluene sulfonic acid

TABLE III

| Example No.: | Phenol | Type catalyst | Amount catalyst | Type carbocyclic mixture | Amount carbocyclic mixture | Reaction temperature, ° C. | Post reaction time, minutes |
|---|---|---|---|---|---|---|---|
| C | 100 | 1 | 1.0 | A | 50 | 50 | 15 |
| D | 100 | 1 | 1.0 | A | 50 | 75 | 15 |
| E | 100 | 1 | 0.3 | A | 70 | 100 | 15 |
| F | 100 | 1 | 0.3 | A | 80 | 75 | 15 |
| G | 100 | 1 | 0.3 | B | 90 | 75 | 45 |
| H | 100 | 2 | 0.5 | B | 70 | 50 | 15 |
| I | 100 | 1 | 0.3 | A | 70 | 75 | 15 |
| J | 100 | 1 | 0.3 | C | 50 | 75 | 15 |
| K | 100 | 2 | 0.5 | C | 90 | 75 | 15 |
| L | 100 | 1 | 0.3 | C | 125 | 85 | 15 |
| M | 100 | 1 | 0.3 | C | 50 | 50 | 45 |
| N | 100 | 1 | 0.3 | C | 75 | 125 | 15 |

EXAMPLE O

To a suitable vessel is charged phenol (100 parts) and sulfuric acid (0.3 part). The carbocyclic mixture of Example A (70 parts) is metered into the starting mixture of stirred phenol plus acid at 70–80° C. After this addition, triethylamine (2 parts), hexamethylenetetramine (3 parts) and 50% Formalin (60 parts) are added. After refluxing for 110 minutes, the mixture is dehydrated to 60° C. and 28″ Hg. Methanol (75 parts) and acetone (8 parts) is added and stirred to solution. A 60% solids varnish is thus obtained.

EXAMPLE P

Phenol (100 parts), 50% Formalin (111 parts) and triethylamine (5 parts) is charged to a vessel. After reacting at 70° C. until the mixture's free formaldehyde content is less than 4%, the mixture is cooled. About 55% solids is obtained.

EXAMPLE 1

20 parts by weight of the first phenolic resin of Example P is added to 100 parts by weight of the second phenolic resin of Example O to produce a solution of the invention having a total resins solids content of about 58% by weight and a total dissolved water content of about 10 weight percent. The weight ratio of the first phenolic resin to the second phenolic resin is about 16%. Cotton linters paper is passed through the Example 1 varnish and the excess removed on scraper bars or between squeeze rolls. After proper drying in a circulating air oven, the treated paper has a resin content of 58% (58 parts resin, 42 parts paper), a volatile content of 6.5% (loss of weight at 160° C./10 minutes) and a flow of 8% (amount of resin squeezed out; 6–2″ discs, 1000 p.s.i., 150° C.). Eight plies of this treated paper are cured at 160° C. and 1000 p.s.i. pressure for 30 minutes This 1/16″ laminate had the following properties:

TABLE IV

| | Range | ASTM test method |
|---|---|---|
| All tests run at 25° C.: | | |
| Water absorption, percent D 24/23—0.5 | 0.3–0.7 | D570–63 |
| Dielectric constant: | | |
| A—4.66 | 4.4–4.7 | D150–59 |
| D 24/23—4.80 | | |
| D 48/50—4.94 | | |
| Dissipation factor: | | |
| A—.034 | .030–.035 | D150–59 |
| D 24/23—.035 | | |
| D 48/50—.040 | | |
| Cold flow, percent E 4/65, C 68/35/90, 50° C., 4,000 p.s.i.—0.6 | 0.4–0.8 | D621–64 |
| Flexural strength, p.s.i. MD—20,480 | 18,000–22,000 | D790–66 |

Each of the following indicated second phenolic resins (above described) is mixed with the first phenolic resin of Example P. 40 parts by acetone are added to each resulting mixture. The result is a varnish solution of the invention. The results are shown in Table V below.

TABLE V

| Example No.: | First resin example | Parts by weight | Second resin example | Parts by weight |
|---|---|---|---|---|
| 2 | P | 10 | O | 100 |
| 3 | P | 30 | O | 100 |
| 4 | P | 20 | B | 100 |
| 5 | P | 20 | C | 100 |
| 6 | P | 20 | G | 100 |
| 7 | P | 20 | L | 100 |
| 8 | P | 40 | O | 100 |

EXAMPLES 2–8

In a preferred organic solution of the invention, the total organic liquid portion thereof (on a 100 weight percent basis when in a form substantially free of other materials) comprises:

(A) from about 5 to 20 weight percent of a lower alkanone, (B) from about 2 to 20 weight percent of at least one aromatic hydrocarbon, and
(C) the balance up to 100 weight percent (total organic liquid basis) of any given solution being a lower alkanol.

What is claimed is:
1. An organic solution adapted for use as a resole resin varnish in the manufacture of electrical grade paper laminates comprising:
   (A) from about 20 to 75 weight percent (total solution basis) of a dissolved mixture of a first phenolic resin and a second phenolic resin, the weight ratio of said first phenolic resin to said second phenolic resin in said mixture ranging from about 1:2 to 1:20 (dry mixture weight basis),
   (B) from about 0.5 to 15 weight percent (total solution basis) of dissolved water,
   (C) the balance up to 100 weight percent (total solution basis) of any given solution being an organic liquid which:
      (1) is substantially inert,
      (2) evaporates below about 150° C. at atmospheric pressures, and
      (3) is a mutual solvent for said mixture and for said water (if present),
   (D) said first phenolic resin being a resole resin characterized by:
      (1) having a formaldehyde to phenol mol ratio of from about 0.9 to 2.5,
      (2) being produced by reacting under aqueous liquid phase conditions phenol and formaldehyde in the presence of an organic basic catalyst,
      (3) having a water solubility such that a 55 weight percent aqueous solution thereof can be prepared, and
      (4) having a free formaldehyde content which is less than about 5 weight percent,
   (E) said second phenolic resin being a resole resin characterized by:
      (1) having an aldehyde to (theoretical) phenol ratio of from about 0.8 to 2.0,
      (2) being produced by reacting under aqueous liquid phase conditions formaldehyde and a substituted phenol mixture in the presence of an organic basic catalyst,
      (3) being substantially insoluble in water but having a viscosity in methanol solution at 60 weight percent solids concentration of not greater than about 5000 centipoises, and
      (4) having a free formaldehyde content which is less than about 5 weight percent,
   (F) said substituted phenol mixture having been prepared by reacting phenol under Friedel-Crafts conditions with from about 35 to 80 parts by weight for each 100 parts by weight of said phenol of a mixture of carbocyclic compounds,
   (G) said mixture of carbocyclic compounds comprising (on a 100 weight percent basis when in a form substantially free of other materials):
      (1) from about 10 through 40 weight percent (total mixture basis) of compounds each molecule of which has:
         (a) the indene nucleus,
         (b) from 9 through 13 carbon atoms,
         (c) as nuclear substituents from 0 through 4 methyl groups,
      (2) from about 5 through 70 weight percent (total mixture basis) of compounds each molecule of which has:
         (a) the dicyclopentadiene nucleus,
         (b) from 10 through 13 carbon atoms,
         (c) as nuclear substituents from 0 through 3 methyl groups,
      (3) from about 15 through 65 weight percent (total mixture basis) of compounds each molecule of which has:
         (a) a phenyl group substituted by a vinylidene group,
         (b) from 8 through 13 carbon atoms,
         (c) as substituents from 0 through 3 groups selected from the class consisting of methyl and ethyl,
      (4) from about 0 through 5 weight percent divinyl benzene,
      (5) provided that the sum total of all such compounds in any given such mixture of carbocyclic compounds is always 100 weight percent.

2. The product of claim 1 wherein said carbocyclic compound mixture comprises:
   (A) from about 20 through 40 weight percent (total mixture basis) of compounds each molecule of which has:
      (1) the indene nucleus,
      (2) from 9 through 13 carbon atoms,
      (3) as nuclear substituents from 0 through 4 methyl groups,
   (B) from about 15 through 30 weight percent (total mixture basis) of compounds each molecule of which has:
      (1) the dicyclopentadiene nucleus,
      (2) from 10 through 13 carbon atoms,
      (3) as nuclear substituents from 0 through 3 methyl groups,
   (C) from about 30 through 65 weight percent (total mixture basis) of compounds each molecule of which has:
      (1) a phenyl group substituted by a vinylidene group,
      (2) from 8 through 13 carbon atoms,
      (3) as substituents from 0 through 3 groups selected from the class consisting of methyl and ethyl,
   (D) from about 0 through 5 weight percent divinyl benzene,
   (E) provided that the sum total of all components in any given such mixture of carbocyclic compounds is always 100 weight percent.

3. The product of claim 1 wherein the weight percent of said dissolved mixture of first phenolic resin and second phenolic resin ranges from about 55 to 65 weight percent.

4. The product of claim 1 wherein the total weight percent of dissolved water ranges from about 6 through 12.

5. The product of claim 1 wherein the water ratio of said first phenolic resin to said second phenolic resin ranges from about 1:4 to 1:8 (dry mixture weight basis).

6. The product of claim 1 wherein the total organic liquid portion thereof (on a 100 weight percent basis when in a form substantially free of other materials) comprises:
   (A) from obout 5 to 20 weight percent of a lower alkanone,
   (B) from about 2 to 20 weight percent of at least one aromatic hydrocarbon, and
   (C) the balance up to 100 weight percent (total organic liquid basis) of any given solution being a lower alkanol.

References Cited
UNITED STATES PATENTS

| | | | |
|---|---|---|---|
| 2,351,716 | 6/1944 | Smith | 260—838 |
| 2,570,513 | 10/1951 | Bloch | 260—838 |
| 2,741,651 | 4/1956 | Been et al. | 260—838 |

JOHN C. BLEUTGE, Primary Examiner

U.S. Cl. X.R.

117—126, 138.8, 155; 161—264; 260—32.8, 33.4, 33.6, 53, 838